Sept. 19, 1939.   O. BORNEMANN   2,173,196
WIND-SCREEN ATTACHMENT
Filed Dec. 4, 1936
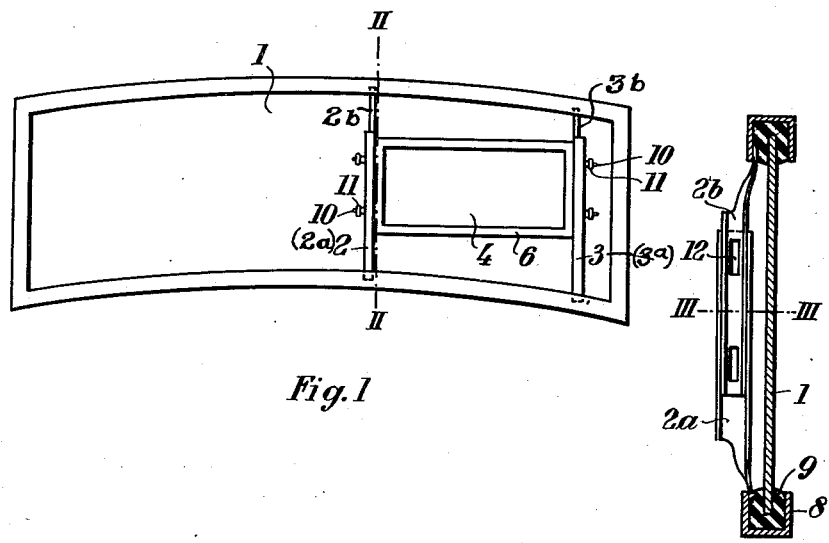
Fig.1
Fig.2
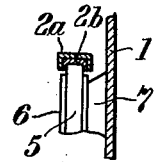
Fig.3
Inventor:
Otto Bornemann Patented Sept. 19, 1939

2,173,196

UNITED STATES PATENT OFFICE 2,173,196

WIND-SCREEN ATTACHMENT

Otto Bornemann, Berlin-Schoneberg, Germany

Application December 4, 1936, Serial No. 114,148
In Germany April 18, 1936

2 Claims. (Cl. 20—40.5)

This invention relates to a wind-screen attachment including a clear-vision pane on a wind-screen of a motor vehicle. The pane is a plain sheet of uncolored glass. The attachment is preferably heated by means such as electric resistor wires known in the art, but it can also be used without heating. This depends on climatic conditions. This attachment is usually effected by rubber suction cups, but is open to the objection that the vacuum produced in the suction cups gradually decreases, due to the fatiguing of stretched rubber parts and for other reasons, and the clear-vision pane drops off the wind-screen in the course of time.

This objection is overcome by the construction hereinafter described in that two supporting bars are fixed, one on each of the opposite sides of the frame of the clear-vision pane, for example by means of screws. These bars have tapered ends designed to be slipped into the frame of the wind-screen. The clear-vision pane can be fitted on the wind-screen by means of these supporting bars adapted to be slipped into the wind-screen frame, as quickly and easily as by means of suction cups. The attachment by means of the supporting bars presents, however, the advantage that the clear-vision pane cannot possibly drop off the wind-screen even after being in use for a long time.

An embodiment of the invention is illustrated, by way of example, in the accompanying drawing, in which—

Fig. 1 shows in elevation a wind-screen with the clear-vision pane secured thereon.

Fig. 2 is a section on a larger scale on line II—II of Fig. 1.

Fig. 3 is a part section on line III—III of Fig. 2.

Fig. 1 shows a wind-screen 1 on which a clear-vision pane 4 of plain uncolored glass is fixed by means of supporting bars 2 and 3. The shape of these bars is shown on a larger scale in Figs. 2 and 3. Each supporting bar comprises an outer part 2a or 3a, and an inner part 2b or 3b. These parts are telescopic so that the total length of the bar can be adapted to the height of the wind-screen. In Figs. 2 and 3 the parts 2a and 2b are of U-section and the recess of part 2b accommodates a rib 5 of frame 6 of the clear-vision pane which has, as usual a rubber packing strip 7 bearing against the wind screen 1. The rib 5 is either continuous or provided at least on the two short sides of frame 6.

The outer ends of the parts 2a and 2b are tapered and, when fitting the clear-vision pane, they are slipped into the gap between the rigid frame 8 and the rubber packing 9 of the wind-screen 1, the length of these parts having been previously adjusted. It is evident that the ends of these supporting bars might equally well be slipped between the pane 1 and the rubber packing 9.

The frame 6 is attached to the supporting bars 2 and 3 by means of screws 10 and nuts 11. The parts 2a, 2b of the supporting bars have slots 12 through which screws 10 pass.

I claim:

1. In a wind-screen attachment for motor vehicles, a clear vision pane, a packing strip of elastic material adapted to be inserted between the clear-vision pane and the pane of the wind-screen, four supporting bars, a tapered end on each bar adapted to be inserted in frame members of the wind-screen, the two bars at each side of the clear vision pane frame being adjustably assembled to form a rigid unit which is joined with said side of said clear vision pane frame at two spaced points.

2. An attachment as specified in claim 1, in which the supporting bars have a cross-sectional shape embracing a rib on the outer surface of the clear vision pane frame.

OTTO BORNEMANN.